US010887075B2

(12) United States Patent
Srivastava et al.

(10) Patent No.: US 10,887,075 B2
(45) Date of Patent: Jan. 5, 2021

(54) METHOD AND SYSTEM FOR ADAPTIVE LINK TRAINING MECHANISM TO CALIBRATE AN EMBEDDED UNIVERSAL SERIAL BUS REDRIVER CLOCK

(71) Applicant: Intel Corporation, Santa Clara, CA (US)

(72) Inventors: Amit Kumar Srivastava, Penang (MY); Chenchu Punnarao Bandi, Bayan Lepas (MY)

(73) Assignee: INTEL CORPORATION, Santa Clara, CA (US)

( * ) Notice: Subject to any disclaimer, the term of this patent is extended or adjusted under 35 U.S.C. 154(b) by 769 days.

(21) Appl. No.: 15/472,145

(22) Filed: Mar. 28, 2017

(65) Prior Publication Data

US 2018/0287771 A1 Oct. 4, 2018

(51) Int. Cl.
*H04L 7/00* (2006.01)
*H04L 25/20* (2006.01)
*G06F 13/40* (2006.01)

(52) U.S. Cl.
CPC .......... *H04L 7/0012* (2013.01); *G06F 13/40* (2013.01); *G06F 13/4045* (2013.01); *G06F 13/4072* (2013.01); *H04L 25/20* (2013.01); *H04L 7/0004* (2013.01)

(58) Field of Classification Search
CPC ..... H04L 7/0012; H04L 25/20; H04L 7/0004; G06F 13/4072; G06F 13/40; G06F 13/4045
USPC .................................................. 375/236, 354
See application file for complete search history.

(56) References Cited

U.S. PATENT DOCUMENTS

| | | | |
|---|---|---|---|
| 2010/0191525 A1* | 7/2010 | Rabenko | H04L 7/0029 704/211 |
| 2013/0156088 A1* | 6/2013 | Jin | H04L 25/03885 375/236 |
| 2016/0079802 A1* | 3/2016 | Choi | H02J 50/10 320/108 |

OTHER PUBLICATIONS

IEEE Std 802.11b-1999: "Higher Speed Physical Layer (PHY) Extension in the 24 GHz Band," IEEE Standard for Information Technology, Telecommunications and information exchange between systems, Local and Metropolitan Networks, Specific requirements, Part 11: Wireless LAN Medium Access Control (MAC) and Physical Layer (PHY) specifications, Sep. 16, 1999, 96 pages.
IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Fitwi Y Hailegiorgis
(74) *Attorney, Agent, or Firm* — Nicholson, De Vos, Webster & Elliott, LLP

(57) ABSTRACT

A method and system implements a repeater in a link of a communication medium. The method and system enables a counter to count alternations of a clock signal received from a host or device over the link, compares a value of the counter to a reference count, adjusts a frequency selection based on the comparison of the value of the counter to the reference count, and locks the frequency selection in response to the counter matching the reference count.

18 Claims, 11 Drawing Sheets

(56) References Cited

OTHER PUBLICATIONS

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE Std 802.11g-2003: "Part 11: Wireless LAN Medium Access Control (MAC) and Physical Layer (PHY) Specifications, Amendment 4: Further Higher Data Rate Extension in the 24 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.
PCI Express® Base Specification Revision 3.0, Nov. 10, 2010, 860 pages.
TPM Main Part 1 "Design Principles," Specification Version 1.2, Revision 62, TCG Copyright, Oct. 2, 2003, 161 pages.
TPM Main Part 2 "TPM Structures," Specification Version 1.2, Revision 62, TCG Published, Oct. 2, 2003, 176 pages.
"Universal Serial Bus 3.1 Specification," Revision 1.0, Jul. 26, 2013, 631 pages.
Wigig White Paper, Wireless Gigabit Alliance, Defining the Future of Multi-Gigabit Wireless Communications, Jul. 2010, 5 pages.

* cited by examiner

CALIBRATION TIMING DIAGRAM AT eDP/eDM

METHOD AND SYSTEM FOR ADAPTIVE LINK TRAINING MECHANISM TO CALIBRATE AN EMBEDDED UNIVERSAL SERIAL BUS REDRIVER CLOCK

TECHNICAL FIELD

Embodiments of the invention relate to the field of interconnections for computing devices; and more specifically, to the operations of Universal Serial Buses in handling signaling over distances requiring a redriver or similar repeater.

BACKGROUND

The Universal Serial Bus (USB) specification is a standard that defines cables, connections and communication protocols used for connection and communication between a Downstream Port and an Upstream port as well as for supply charging current or a power supply to connected electronic devices. The USB standard has evolved over time to utilize various connector types, to support varying data rates and to support varying features. For example, embedded USB (eUSB) (e.g., eUSB2) is utilized to enable communication between an eUSB host and an eUSB device across a platform (e.g., across a mainboard or system board). However, such eUSB systems suffer from signal integrity issues in many cases if the link is greater than twelve inches in length or insertion loss is more than −10 dB. Where such distance constraints or losses cannot be met, a repeater can be utilized to improve signal degradation to recover a loss. This includes the use of a repeater in some platforms to compensate for channel loss and preserve the system routing requirements in terms of signal integrity. Similarly, there is an increasing use of longer USB cables that require repeaters in the cable itself to support the extended lengths. As a result, new connectivity models have emerged for embedded USB and similar protocols (e.g., USB 3.1) that include a single repeater or multiple repeaters between the USB host and device. The use of repeaters can address the signal integrity needs of a system, but each repeater may require its own clock and this clock is not tuned to enable pre-emphasis of retransmitted signals. Pre-emphasis is a method of signal boosting for half or quarter period time or other fractional period of time to counter signal loss.

There are different types of repeaters that can be used with USB communication mediums. These repeaters include redrivers and retimers. A repeater refers to any active component that acts on a signal in order to increase the physical lengths or distance the signal can be successfully transmitted and that counteracts various types of interconnect loss to ensure the signal can be transmitted successfully.

A retimer refers to a component that contains a clock-data recovery (CDR) circuit or retiming circuits that "retimes" the signal. The retimer latches the signal in a synchronous manner before re-transmitting it. A retimer is used to extend the physical length or distance the signal can be successfully transmitted within a medium or system without accumulating high frequency jitter by creating separate clock domains on either side of the retimer. Furthermore, a retimer can be implemented based on a separate reference clock independent signal sensor conditioner retimer or a bit-level retimer.

A redriver refers to an analog or an active component that operates on the signal without re-timing it. The redriver may include components for signal amplification or level shifting, receiving, passive equalization and transmitting. The redriver does not include a CDR or retiming circuits.

Retimers and redrivers can include a captive retimer/redriver or a link segment retimer/redriver. A captive retimer/redriver refers to a retime/redriver that is located on the same host or device system. The retimer/redriver is associated with the host or device. A link segment retimer/redriver is situated in a cable or similar medium between a host and device where a link segment refers to a transmitter-channel-receiver combination between a downstream port and a retimer/redriver upstream port, an upstream port and a retimer/redriver or two retimers/redriver.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
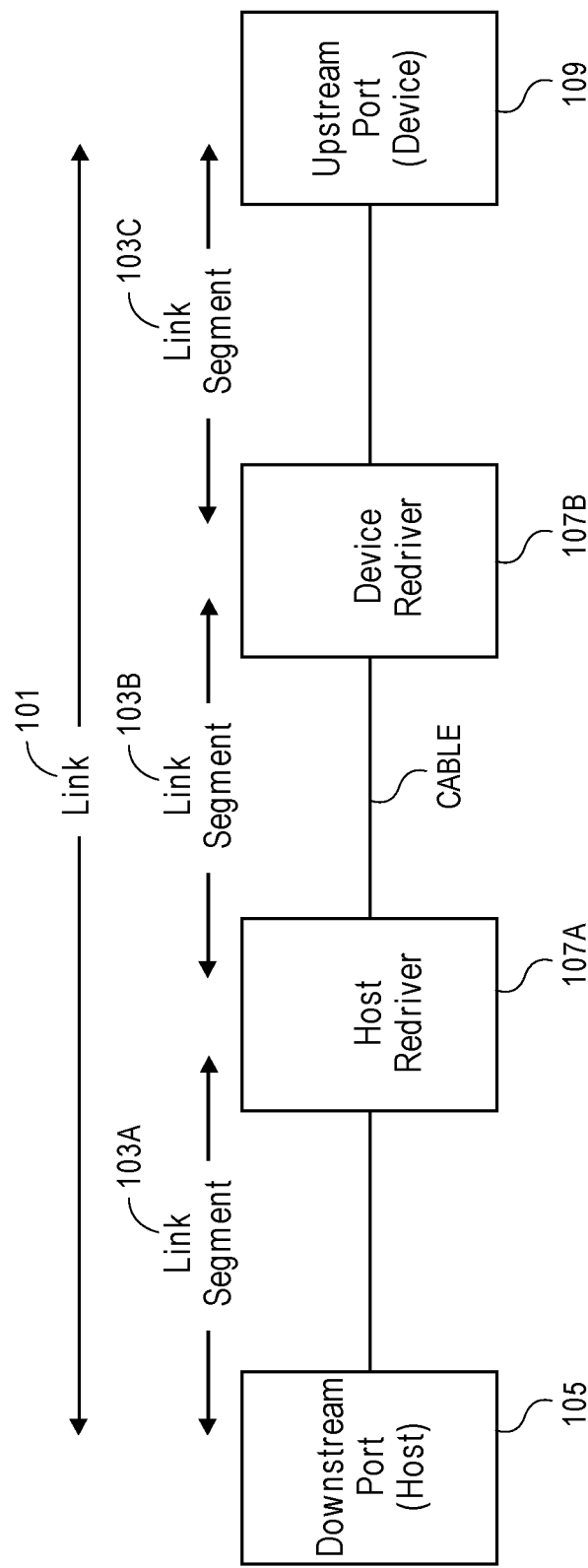
FIG. 1 is a diagram of one embodiment of a link including a host or device, set of repeaters and device.

The embodiments provide a set of processes and mechanisms that provide link training where the redriver clock frequency can be calibrated using a forward differential clock sent by the embedded Universal Serial Bus (USB) (e.g., eUSB2) host/device upon receipt of a request from a host or device (host/device) system to calibrate a redriver clock. The timing of the calibration can be during the cold boot of the system, in response to a request from the redriver or during link idle times at the request of the host/device system request. The redriver samples the received forwarded clock using its own ring oscillator clock. The redriver enables its internal counter to count the samples. In one embodiment, the calibration can be implemented using tuning circuit with a finite state machine (FSM). The logic of the FSM compares the count value (e.g., the frequency of the forward clock signal in relation to the frequency of the local ring oscillator clock ($F_{Fwd\_clk}/F_{Ring\_osc\_clk}$)) with reference count values and recalibrates its own ring-oscillator clock using a set of frequency selection (freq_sel) bits. In some embodiments, the FSM utilizes counts for multiple cycles to generate an average count based on these cycles.

The embodiments overcome issues with embedded USB (eUSB) or USB specification (e.g., eUSB2 specification or USB 3.1 specification) links or repeaters or similar protocol communications related to loss of signal integrity. The eUSB and USB specifications define communication (e.g., some versions using low voltage signaling) in between an eUSB/USB Host and eUSB/USB device along an eUSB/USB link. For sake of clarity and conciseness the example of an eUSB2 redriver is discussed primarily herein. However, one skilled in the art would understand that the principles, structures and systems described in relation to eUSB is applicable to USB and similar communication protocols and media. The embodiments provide a system and processes that can be used where the length of the link causes the signal integrity to fall below an acceptable level.

In particular, the embodiments provide a system and processes wherein the link includes a repeater and in particular a redriver that is responsible for receiving data from the host/device and for retransmitting the data to a device/host at the other end of the link (e.g., retransmitting data from an eUSB host to an eUSB device or vice versa. Similarly, the redriver receives data from the device and forwards the received data from the device back to the host. More specifically, the embodiments provide flexibility in redriver placement to optimize the platform real-estate effectively. The embodiments are a low-cost solution, which avoids need for an expensive retimer and helps in saving nearly 10-15 cents of the bill of materials (BOM) cost. Further, the embodiments help in enabling pre-emphasis techniques at the redriver to address platform channel loss and additional platform component related loss like losses associated with multiplexors or combiners which require precise clocking.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

As used herein, the phrase Universal Serial Bus (USB) generally refers to a specification(s) for a serial bus that supports the transmission and reception of data (e.g., and power and/or control) between a downstream facing port (e.g., a host) and a one or more upstream facing ports (e.g., devices), for example, through one or more hubs there between. The phrase embedded USB refers to a specification for a serial bus that supports transmission and reception of data as well as power and control between a host and a device where the host and device are situated on a mainboard or similar substrate. The host may be a processor, controller, system on a chip (SOC) or similar component whereas the device may be any other system component such as a memory device, communication device, peripheral controller or peripheral device or similar component.

FIG. 1 is a diagram of one embodiment of a link including a host, host repeater, device repeater and device. The link 101 is provided by way of example of a simplified illustration of link connectivity between a host 105 and a device 109 with two repeaters 107A, 107B in between. In the illustrated embodiment, the link 101 can be a USB or eUSB link, whereas in other embodiments the link 101 can be a medium over which communication is controlled by other similar communication protocols. The example of an eUSB link and eUSB components is provided by way of conciseness and clarity. However, one skilled in the art would understand that the principles and mechanisms would also apply to other communication protocols and media.

The link 101 is sub-divided into link segments 103A-C. The link segments 103A-C can have any length of configuration. Where the link exceeds a distance over which the signal can be sent between the host 105 and device 109 and successfully decoded (e.g., communication over a link with a length greater than the length, which causes insertion loss to be more than −10 dB in some platforms which causes loss of signal integrity or loss of data), then repeaters may be inserted in the link 101. The portion of the link 101 between a host 105 and device 109 or between the host 105 or device 109 and repeaters 107A, 107B or any combination thereof can thereby be kept within the parameters required to maintain signal integrity for the link 101.

A transmitted signal may originate from either the host 105 or device 109, upon reaching the repeaters 107A, 107B, the signal may be attenuated and distorted, due to the fact that channels connecting between the host 105 and device 109 present themselves as a low pass filter. The repeaters 107A, 107B are placed between host 105 and device 109 to restore the weakened signal such that it may reach its farther destination. In the example, a host repeater 107A is proximate to the host 105 and may be calibrated by the host 105 as described herein below. Similarly, the device repeater 107B is proximate to the device 109 and may be calibrated by the device 109 as described herein below. In one embodiment, link 103B could be a platform board routing and component at both host or device side and both host and device system can be connected through a cable.

Figure 2:
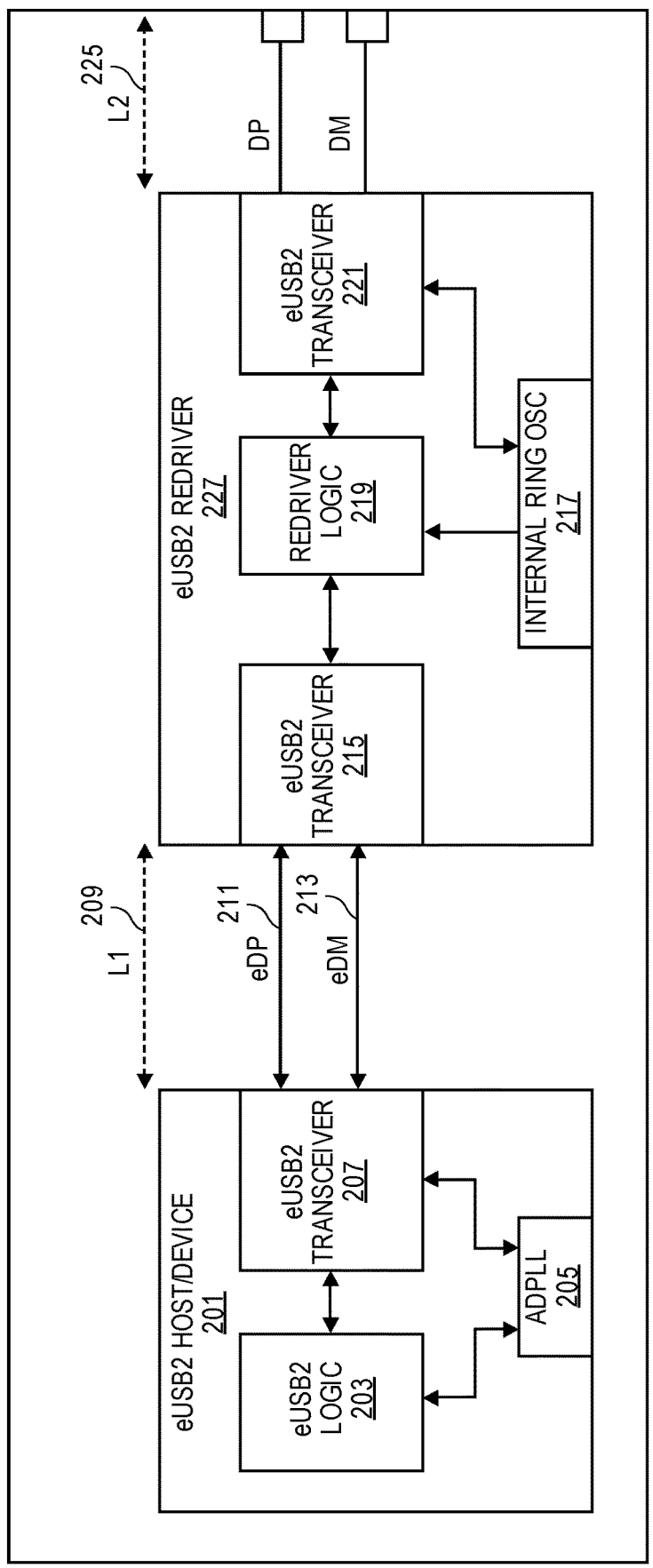
FIG. 2 is a diagram of one embodiment of a host or device redriver circuit for an embedded Universal Serial Bus (USB) link.

FIG. 2 is a diagram of one embodiment of a host/device redriver circuit for an embedded USB link. The illustrated components can be part of a link where a host calibrates a redriver or where a device calibrates a redriver. The relevant components are analogous. The components of the host/ device 201 (e.g. eUSB2 host or eUSB2 device) and the redriver 227 (e.g., eUSB2 redriver) are shown in greater detail. The host/device 201 includes a logic 203, a transceiver 207 and a phase locked loop 205 (e.g., an all-digital phase locked loop (ADPLL)). The logic 203 manages the host/device 201 implementation of the communication protocol to drive the transceiver to send and receive data over the link segment 209. The transceiver 207 transmits and receives data over the link segment 209 via the embedded D+ pin (eDP) 211 and embedded D− pin (eDM) 213 of the link segment 209. The ADPLL synchronizes the host/device 201 with the system and system clock.

The redriver 227 includes a transceiver 215, internal oscillator 217, logic 219 and second transceiver 221 connected with a separate link segment 225. The transceivers 215 and 221 manage the transmitting and receiving of data over the DP and DM of the respective link segments 209 and 225. The redriver logic 219 discussed further herein below manages the implementation of the communication protocol to process inbound and outbound data traffic on each link segment 209 and 225. The internal oscillator 217 drives the operation and timing of the redriver 227.

Figure 3:
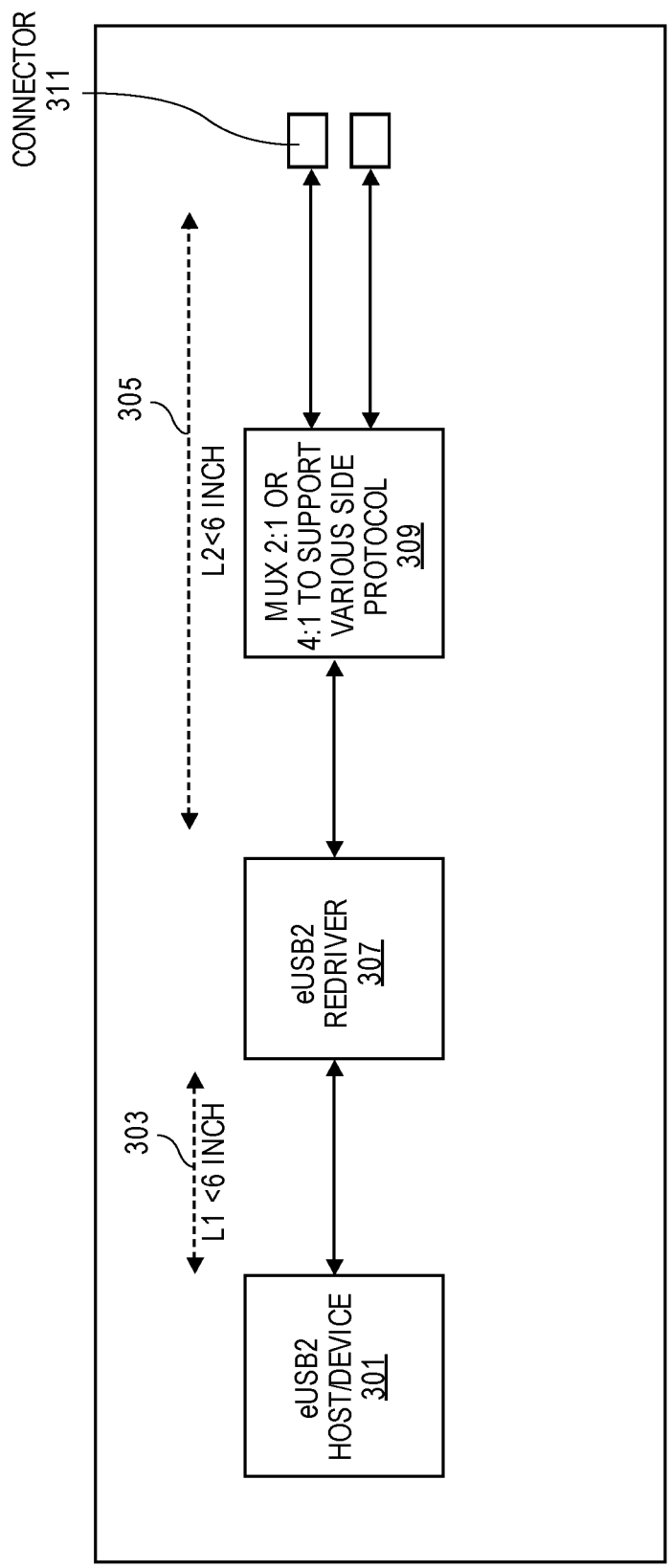
FIG. 3 is a diagram of one embodiment of a topology of an embedded USB link with a repeater.

FIG. 3 is a diagram of one embodiment of a topology of an embedded USB link with a repeater. The diagram illustrates the issues related to placement of components and the lengths of links in a platform (e.g., on a mainboard or via components such as cables and ribbons communicatively coupling components in a system). The placement of redrivers at the platform level imposes significant challenges for system designers, especially for client and server segments where a maximum trace length (i.e., length of the link) may have a target of more than 12 inches, which would cause signal integrity and data loss issues. Discrete component at the platform introduce additional platform losses. Resistance and capacitance of discrete components can be a max of 10 Ohm and 10 pF before the impact of signal losses becomes much more severe.

Designing link topologies in a platform presents challenges and constraints including maintaining signal integrity such that the placement of a redriver creates link segments (e.g., L1 303 and L2 305) that are not more than 12 inches, where there is not any pre-emphasis technique employed. Pre-emphasis is a technique where a signal is modified at the point of transmission to anticipate some weakening of the signal over a link or link segment such that the signal remains decodable at the next point in the link or link segment using precise clock signals.

In some possible designs, the placement of a repeater may create link segments that are not equal in length. For example, L1 303 may be short while L2 305 is longer, however, such designs may not be viable because a redriver does not have an accurate clock. The redriver clock is running at a frequency of the ring oscillator clock which has accuracy issues (e.g., +/−50% accuracy) and using pre-emphasis requires a precise clock at the redriver.

In other possible topology designs, a first link segment L1 303 is increased in length (e.g., where pre-emphasis is used at the host/device 301, which has a precise clock) and then the second link segment L2 305 is shorter (e.g., where a redriver 307 is placed near to a device or connector 311). However, this design limits platform flexibility in placing the redriver and this approach may also suffer significant platform channel loss due to a combinator or multiplexor (mux) 309 placement, which may have ~5-10 Ohm resistance and up-to 10 pF capacitance and which is required to support various other side band protocols in order to save SOC pins. The combinator or mux 309 may be a discrete component to support side band signaling or battery charging directions.

In addition, the use of a retimer instead of a redriver is possible, but a retimer requires different components with an increased cost (e.g., an additional 10-15 cents in comparison to a redriver). The embodiments take these factors into consideration and provide a redriver with a link training mechanism to tune the redriver internal clock frequency. The tuned precise clock helps to enable pre-emphasis at the redriver regardless of the location of the redriver. This approach provides more flexibility for system engineers to place the redriver within the platform with a location based on other considerations and conveniences that are cost effective while still avoiding signal integrity loss cause by redriver, for example a redriver servicing a host/device for a USB connector.

Figure 4:
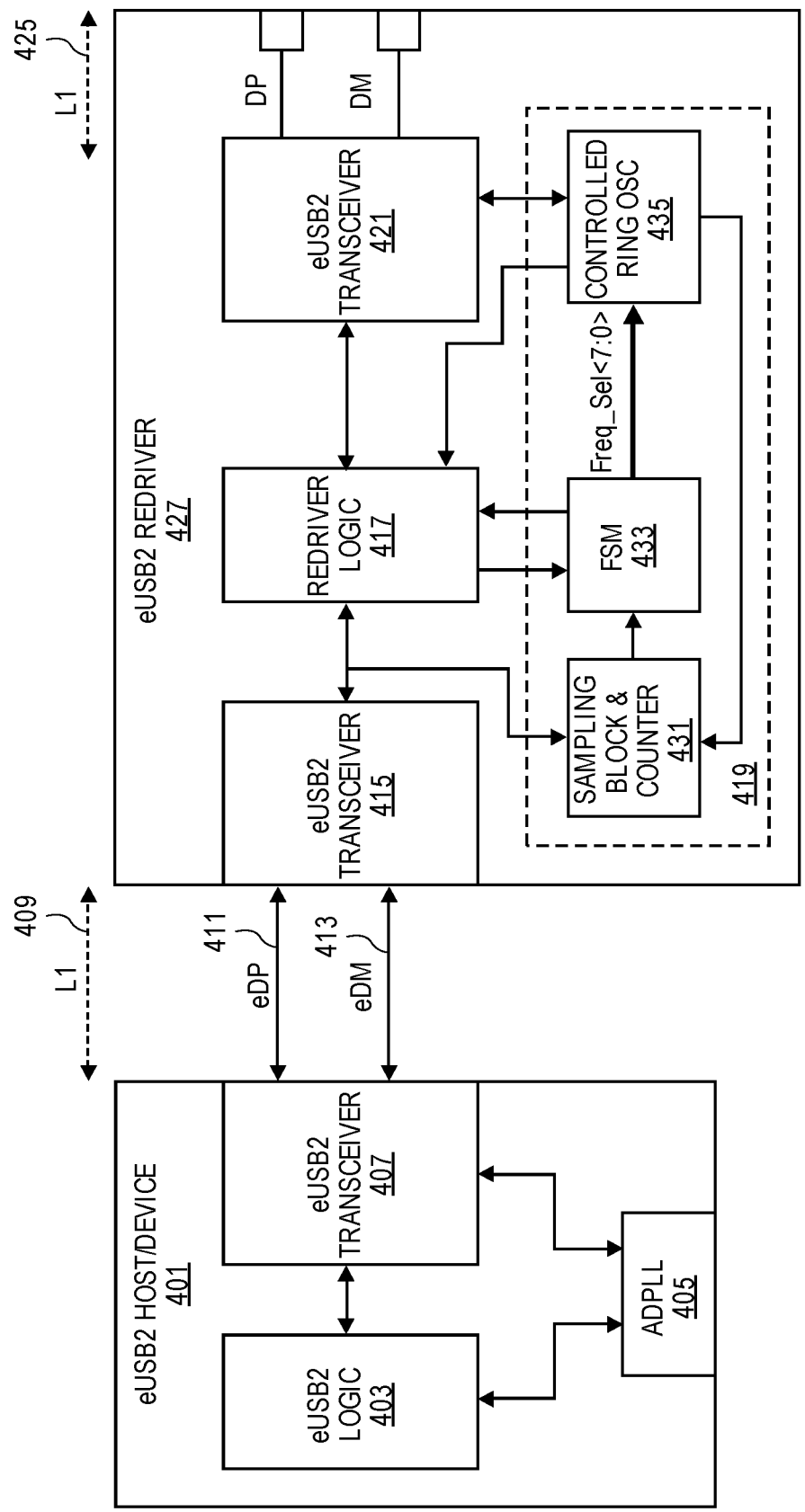
FIG. 4 is a diagram of one embodiment of redriver circuit with a calibration circuit.

FIG. 4 is a diagram of one embodiment of redriver circuit with a tuning circuit. As with the embodiments discussed above, the redriver 427 can communicate with either a host or device 401 to perform the calibration process. The components of the host/device 401 (e.g. eUSB2 host/device) and the redriver 427 (e.g., eUSB2 redriver) with tuning circuit 419 are shown in greater detail. The host/device 401 includes a logic 403, a transceiver 407 and a phase locked loop 405 (e.g., an ADPLL). The logic 403 manages the host/device 401 implementation of the communication protocol to drive the transceiver 407 to transmit and receive data over the link segment 409. The transceiver 407 transmits and receives data over the link segment 409 via the eDP 411 and eDM 413 of the link segment 409. The ADPLL 405 synchronizes the host/device 401 with the system from the system clock or reference clock.

The redriver 427 includes a transceiver 415, turning circuit 419, logic 417 and second transceiver 421 connected with a separate link segment 425. The transceivers 415 and 421 manage the transmitting and receiving of data over the eDP/eDM and DP/DM of the respective link segments 409 and 425. The redriver logic 419 manages the implementation of the communication protocol to process inbound and outbound data traffic on each link segment 409 and 425.

The tuning circuit 419 includes a sampling block and counter 431, a finite state machine (FSM) 433 and a controlled ring oscillator 435. The sampling block and counter 431 samples and counts the received clock signal. The FSM 433 monitors the count and sampling and determines a frequency (via the frequency selection bits (freq_sel) to set the operation of the controlled ring oscillator 435. The controlled ring oscillator drives the operation and timing of the transceiver 421.

The tuning circuit 417 provides a link training mechanism where the redriver clock frequency is calibrated using the received forward differential clock sent by the host (e.g., the eUSB2 host 401). The forward differential clock is sent by the host 401 upon receiving request from the redriver 427 during cold boot and/or during link idle times. The redriver 427 via the tuning circuit 419 samples the received forwarded clock using its own ring oscillator clock and enable its internal ripple counter to count the samples. The FSM 433 logic compare the count value ($F_{Fwd\_clk}/F_{Ring\_osc\_clk}$) with a reference count value and recalibrate its ring-oscillator clock 435 using the freq_sel bits.

The link training process of the tuning circuit 419 can be initiated during the cold boot, when the link is idle or upon a clock training request from the redriver 427 through redriver logic 417 or from host/device 401. The host 401 starts sending a low frequency differential clock on the eDP and eDM lines for $T_{training\_period}$. The redriver 427 receives the differential clock through a receiver buffer of the transceiver 415 and sends the differential clock signal to the sampling block/counter 431 that is running on an internally generated ring-oscillator clock 435 with tuning capability. The FSM 433 samples the counter value for a cycle of a received differential clock (i.e., of the forward clock from host/device 401) and sampled count value and then compares this with a target divider ratio. Depending on this comparison the FSM 433 controls the ring oscillator 435 frequency through a freq_sel signal, where a set of bits are set that control the oscillator frequency. The oscillator can have any range of granularity in its frequency settings and the number of frequency selection bits can be selected based on the granularity of this range. For example, a number (N) of target oscillations can be calculated as $N_{target}=F_{fwd\_clk}/F_{ring\_osc\_clk}$, where if $N_{count}>N_{target}$ then the freq_sel bits decreases to decrease ring oscillation frequency and if $N_{count}<N_{target}$ then the freq_Sel is increased to adjust the ring oscillation frequency.

The FSM 433 can continue training till $N_{count}$ meets that of a $N_{target}$ value and there is a consistent or locked freq_sel signal. In some embodiments, the FSM 433 also handles the filtering of the counts value by averaging results over a couple of cycles (where a count N is generated by the sampling counter for period of N received cycles and generates an average count which is compared to a target reference count. In this case, the average for N received clock cycles and an update for 1 clock cycle based on these detections). Once a consistent or locked frequency is generated for the local ring oscillator 435 and the training period—$T_{training\_period}$ expires, then the redriver 427 sends a training complete indication to the host/device 401. After getting this completion message and in some cases an acknowledgement from the host/device 401, then the host/device 401 and redriver 427 return to a standard operational or functional mode.

Figure 5:
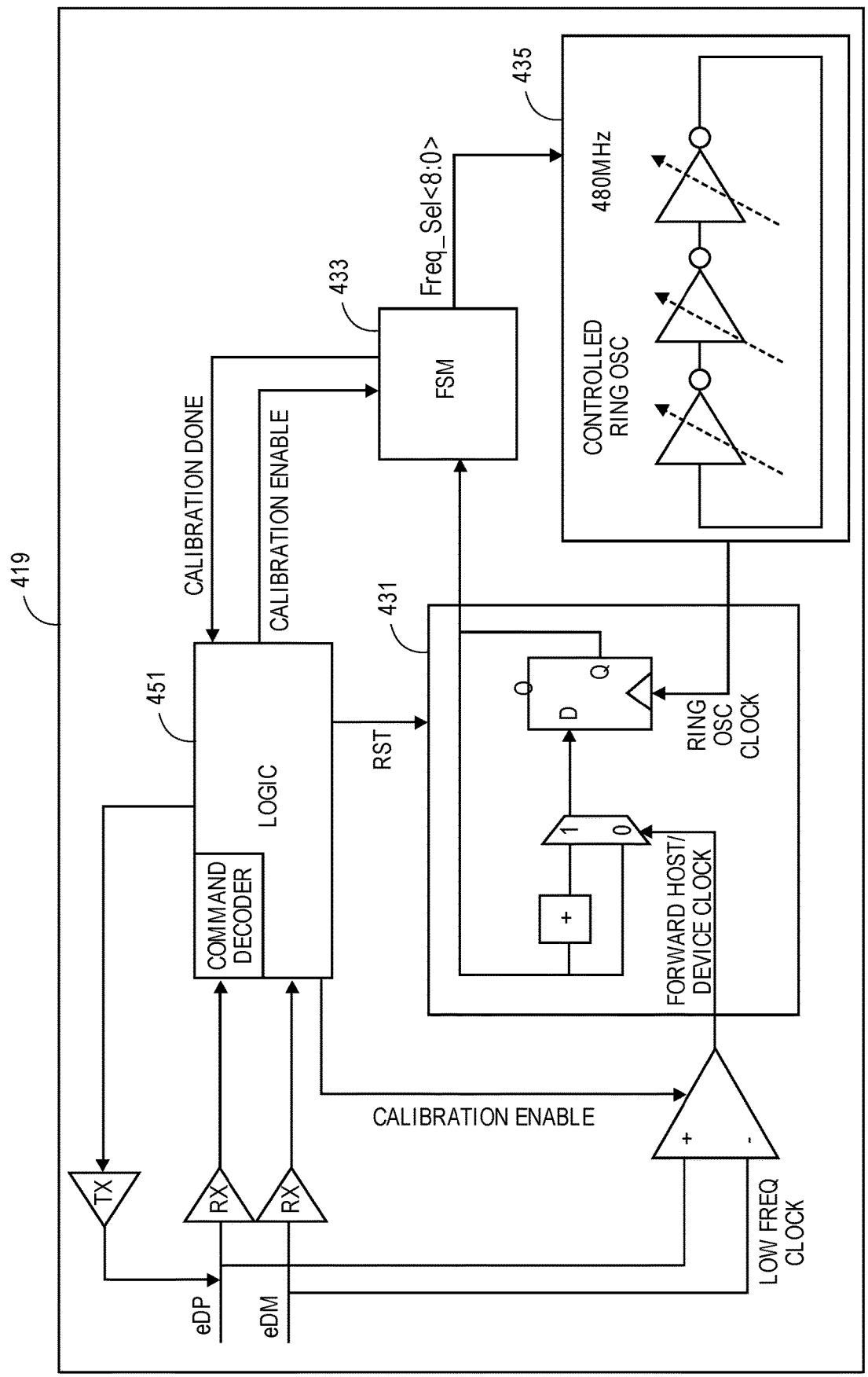
FIG. 5 is a diagram of one embodiment of a calibration circuit for a redriver.

FIG. 5 is a diagram of one embodiment of a tuning circuit for a redriver. The block diagram provides additional detail of the tuning circuit 419. The tuning circuit 419 includes a logic component 451 including a command decoder that enables the tuning circuit to determine whether commands to start the tuning process have been received from the host/device for the case of a host/device implementation. The tuning circuit 419 further includes the FSM 433, ring oscillator 435 and sampling and counter circuit 431. The illustrated embodiment is provided by way of example and not limitation. One skilled in the art would understand that there are additional elements that are not illustrated for sake of conciseness and clarity and that there are alternate implementations that are consistent with the structures and principles present in relation to the illustrated embodiments.

Before the start of a training period the tuning circuit 419 receives an indication of a command code request that is sent to the redriver 419 by the host/device or is initiated by the redriver 419 using single ended signaling (e.g., as defined in eUSB2 protocol where embedded eDP lanes include a clock and embedded eDM lanes have command codes). The logic interprets the command code as an indication to initiate training of the ring oscillator clock. In other embodiments, the logic 451 may initiate the training in response to detecting a startup/cold boot, idleness of the link or similar condition. In one embodiment, special command codes are used and communicated as defined in the eUSB2 specification. The logic 451 can send enabling signals for training/calibration to other components of the tuning circuit 419.

Once training starts, the host/device sends a differential clock frequency clock to the redriver 427. The redriver 427 receives the clock, which is then sampled at the sampling and counter 431 based on its ring oscillator clock 435. The FSM 433 compares the count value to calibrate or recalibrate the ring oscillator clock 435.

Figure 6:
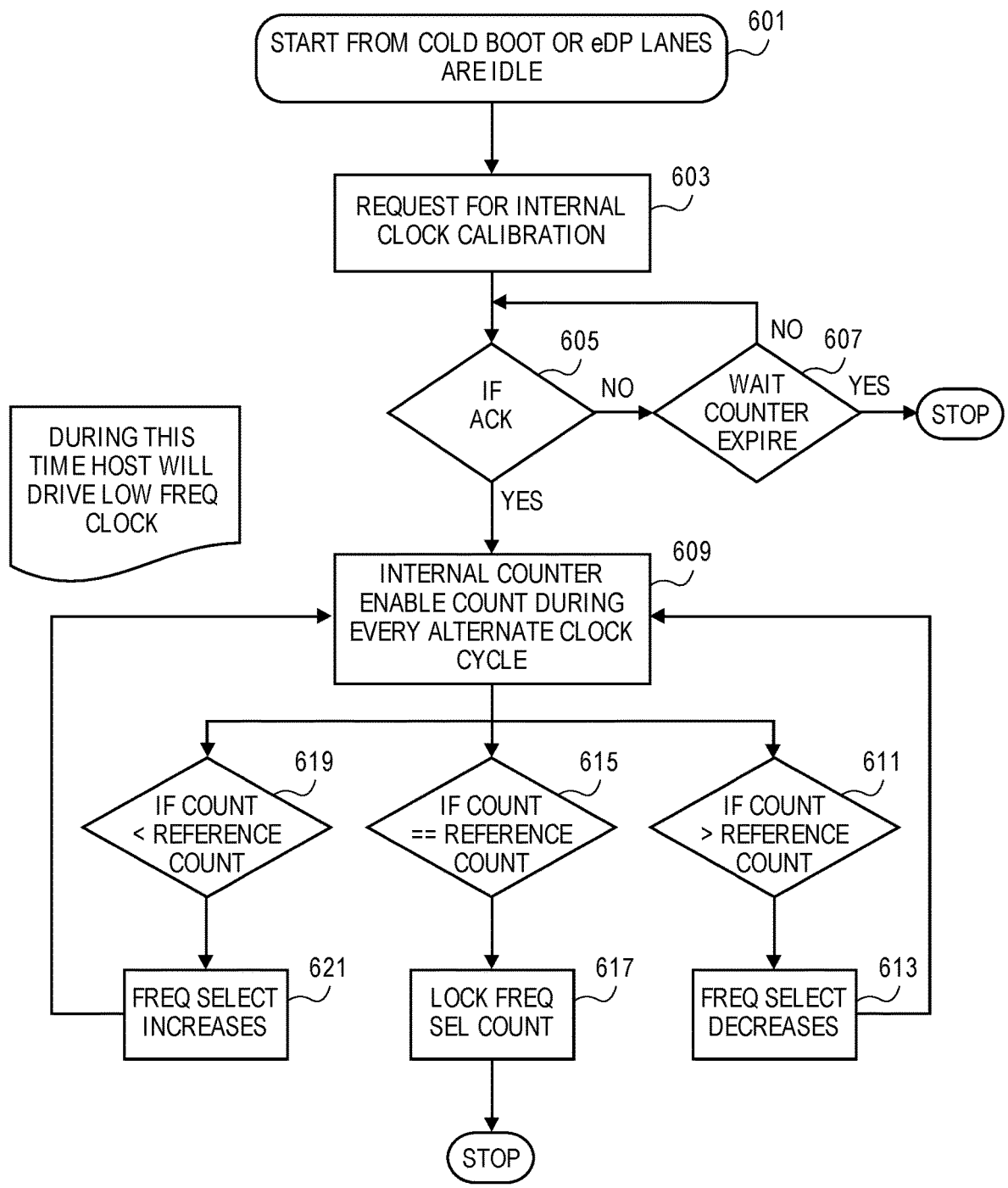
FIG. 6 is a flowchart of one embodiment of a process for the finite state machine of the redriver.

FIG. 6 is a flowchart of one embodiment of a process for the finite state machine of the redriver. Generally, the flowchart shows the detailed internal FSM process and signals during link training. The FSM samples the received host/device clock using the high frequency ring oscillator clock for one clock cycle or N Clock cycles (for averaging) to get frequency information; during the next clock cycle the FSM does a comparison and selects a new freq_sel value within a second clock cycle (or after N+1 the cycle for averaging case). The FSM starts counting again during a third cycle (or N+2 for the cycle averaging case). The FSM keeps on repeating these cycles until the time $N_{count}$ meets the target $N_{target}$ value. The FSM is also responsible for doing averaging for multiple cycles to filter out the count value (where it counts average over N cycle, N+1 cycle for comparison).

Specifically, the process may be initiated at a cold boot from the host/device or when the link is determined to be idle (Block 601). The determination of an idle link can be by any mechanism or process. The tuning circuit sends a request to the host/device for a clock signal to perform the recalibration (Block 603). The tuning circuit awaits an acknowledgement from the host/device (Block 605). If no acknowledgement is received during a wait period monitored by a wait counter, then the process may restart or exit (Block 607). If an acknowledgement is received, then the process enables the tuning circuit counter and counts each alternating clock cycle (Block 609).

The FSM checks and compares the alternating clock cycle count to a reference or target count. If the received clock sampled count is less than the reference (Block 614), then the FSM increases the frequency select (i.e., increases the ring oscillator frequency) (Block 621). If the received clock sampled count is equal to the reference count (Block 615), then the FSM locks or sets the frequency of the ring oscillator (i.e., sends the freq_sel value to the ring oscillator) (Block 617). If the received clock sampled count is greater than the reference (Block 611), then the FSM decreases the frequency select (i.e., decreases the ring oscillator frequency) (Block 613). In some implementations, the freq_select increase/decrease will be the opposite to the examples described herein dependent on the ring oscillator implementation, however, one skilled in the art would appreciate that these alternate embodiments are within the scope of the structures and principles described herein. The counting of the received clock continues and is reset with each comparison until the reference count matches the actual count of the received clock. In some embodiments, the process may also have a timeout or training period during which the calibration is completed. If the process does not reach a locked frequency selection by the expiration of the training period then the process may stop and locked to a previously stored value (i.e., before a start of training or default value and a report timer is not sufficient) for the current frequency selection value.

Each of these functions can be implemented in circuits or hardware components within the FSM. In addition, any of these operations can be executed by a processor or microcontroller that are components of the FSM that executes instructions or is micro-coded to perform any of the described operations. These operations can be implemented by any combination of hardware circuits, coding or microcoding.

Figure 7A:
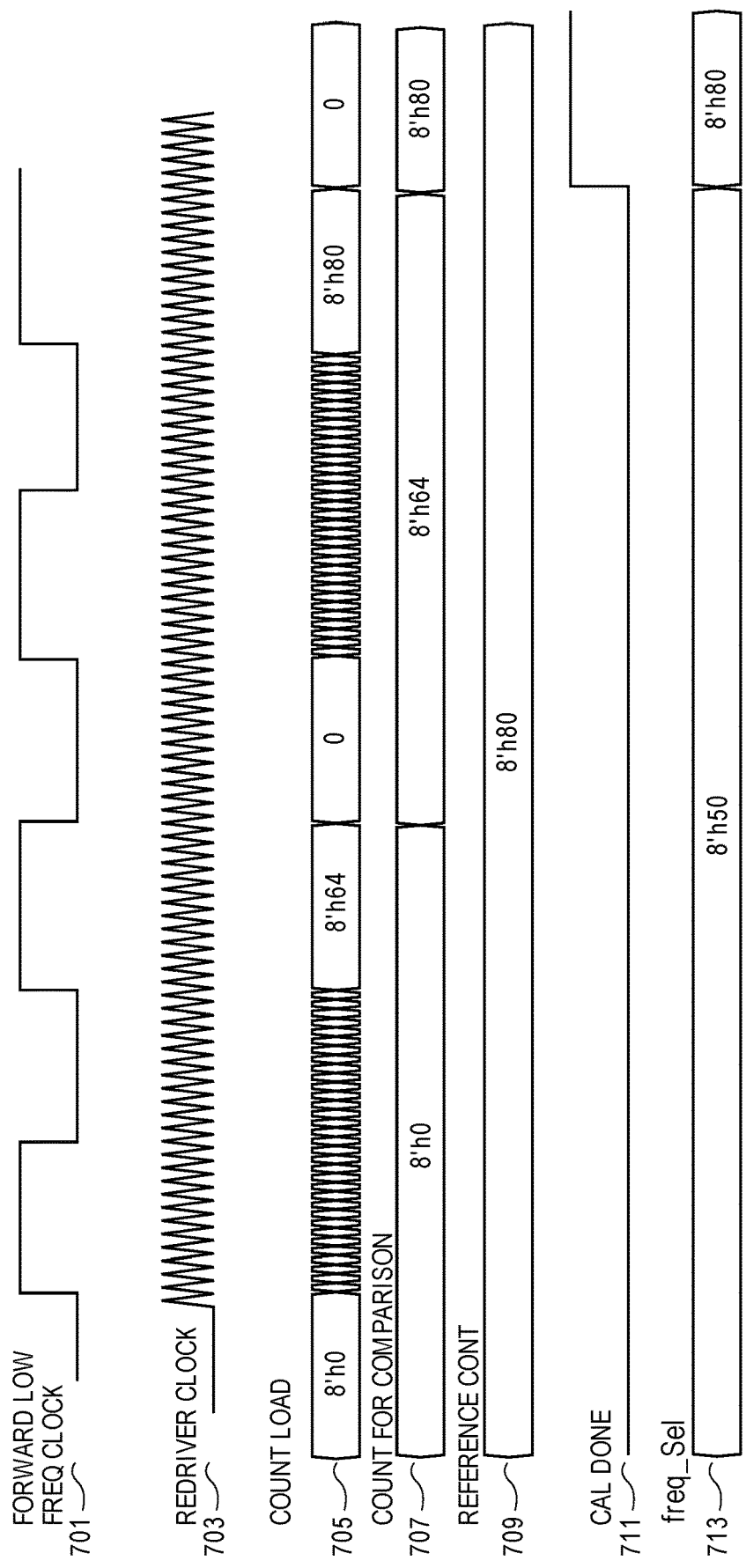
FIG. 7A is a timing diagram for the redriver where there is a comparison between a first cycle and a second cycle.

FIG. 7A is a timing diagram for the redriver where there is a comparison between a first cycle and a second cycle. In this example, the redriver receives and generates a set of signals during a calibration process. The received clock signal from the host/device is referred to as the forward low frequency clock 701. The redriver has an internal ring oscillator clock signal 703. As the calibration process begins a count load 705 or count of the relative number of received clock alternations is maintained. This updates a count for comparison 707. A reference count of the current ring oscillator is also maintained 709. A calibration done 711 signal is raised when the calibration is completed. The result is the freq_sel 713 output that changes the setting of the ring oscillator or locks them in when the calibration matches the received clock count with the reference count.

Figure 7B:
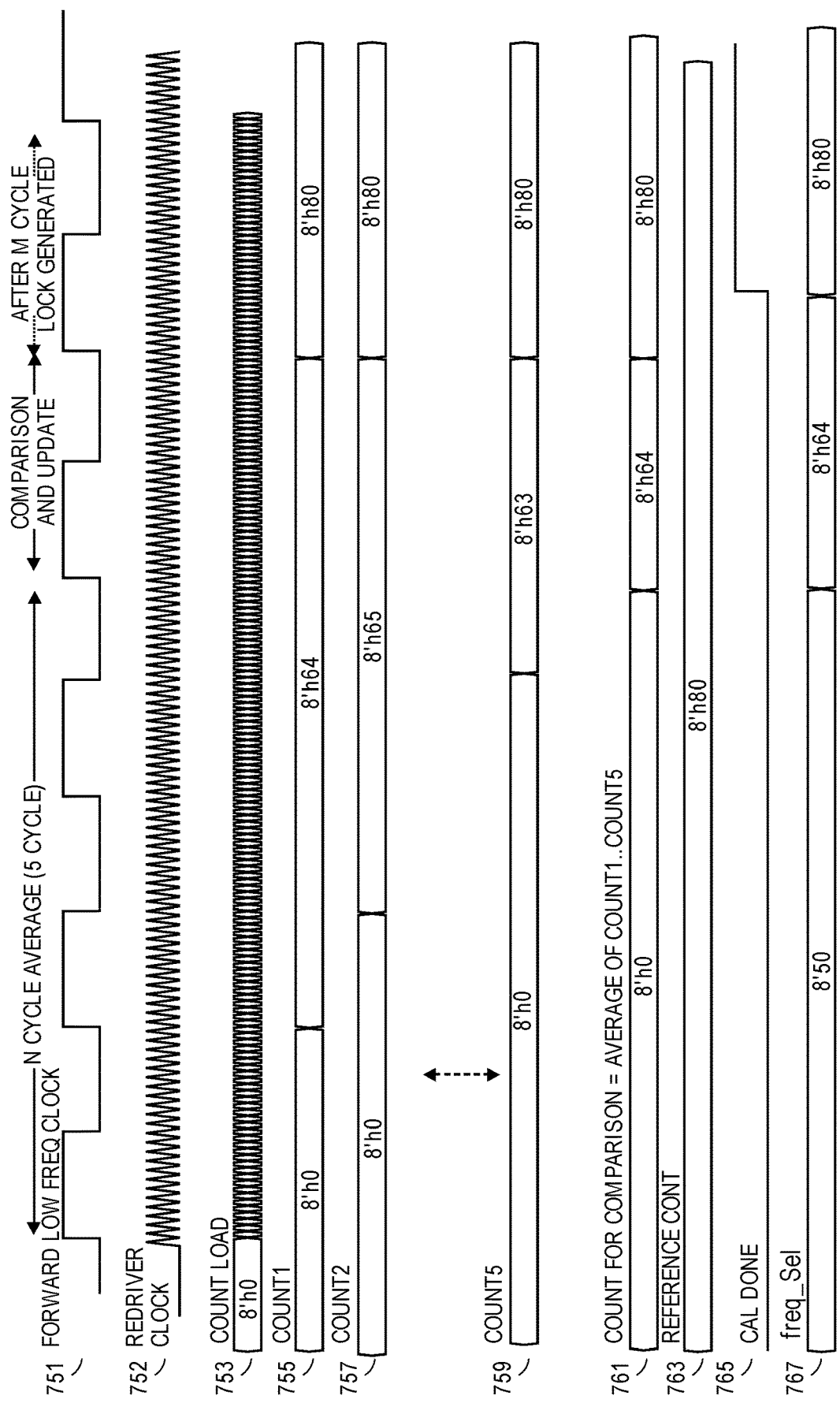
FIG. 7B is a timing diagram for the redriver where there is an averaging of counting for cycles.

FIG. 7B is a timing diagram for the redriver where there is an averaging of counting for cycles. In this example, the redriver receives and generates a set of signals during a calibration process. The forward low frequency clock 751 is received from the host/device for an N cycle averaging before a comparison and then update. The redriver has an internal ring oscillator clock signal 752. As the calibration process begins a count load 753 or count of the relative number of received clock alternations is maintained. This updates a set of counts 755-759 for comparison. A count for comparison 761 is generated from these counts as an average. A reference count of the current ring oscillator is also maintained 763. A calibration done 765 signal is raised when the calibration is completed. The result is the freq_sel 767 output that changes the setting of the ring oscillator or locks them in when the calibration matches the received clock count with the reference count.

Figure 7C:
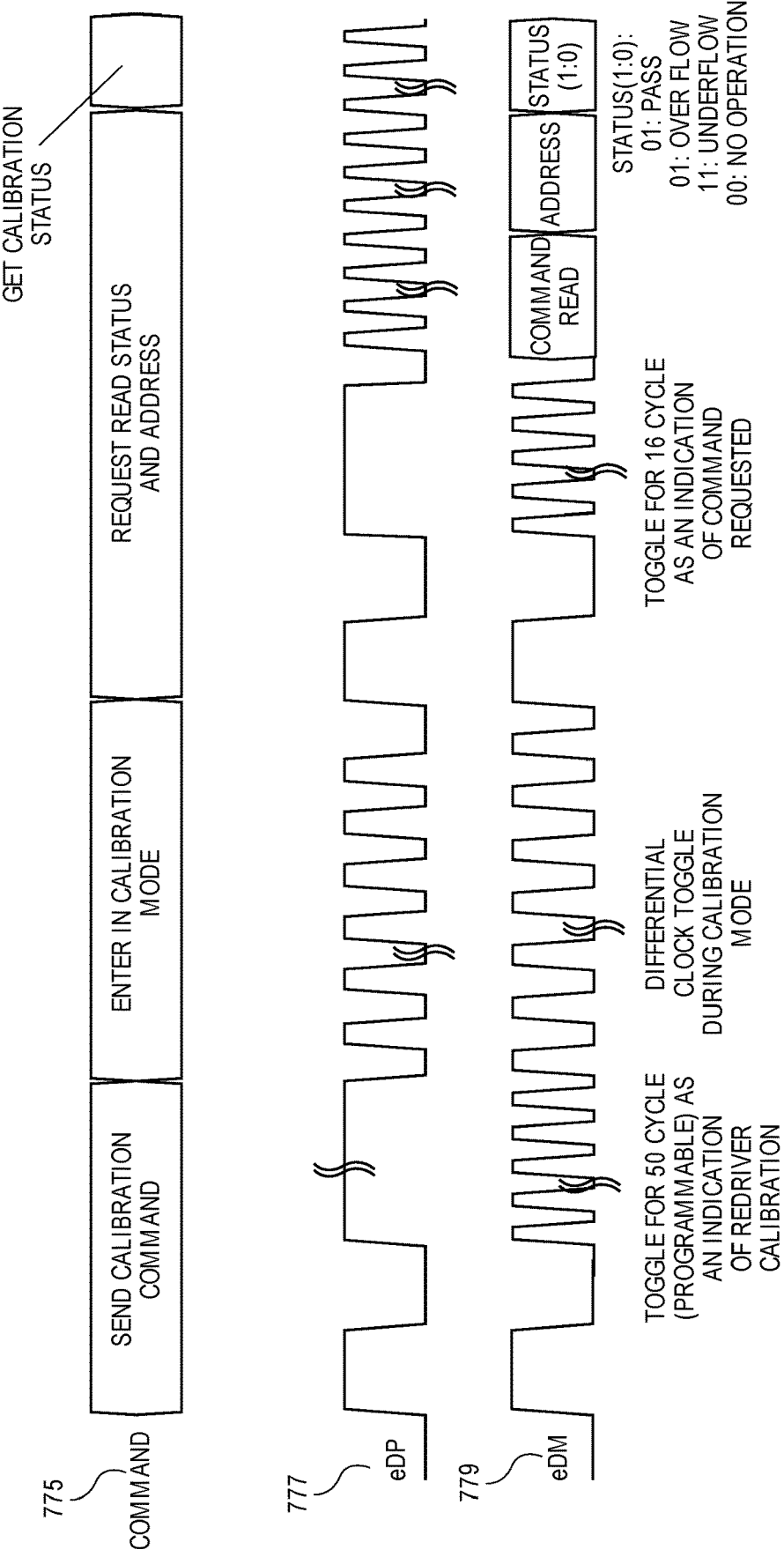
FIG. 7C is a timing diagram for eDP and eDM timing during calibration and command transmission.

FIG. 7C is a timing diagram for eDP and eDM timing during calibration and command transmission. The signaling on the eDP 777 and eDM 779 lines during calibration is correlated with the transmission and receipt of commands related to calibration. The timing diagram shows the toggling of the eDP 777 eDM 779 during a calibration command being sent, the calibration period/mode, the receipt of a request for the reading of the calibration status and the reading of the calibration status. These periods may be performed in sequence, however, in other embodiments alternative sequences are possible. In one example embodiment, the eDM may be toggled for a set number of cycles to indicate redriver calibration. The eDP and eDM may then carry the differential clock signal. After calibration, the eDM may be toggled for a set number of cycles to indicate a request for calibration status. The eDM can then transmit the command, address and status information.

Figure 8:
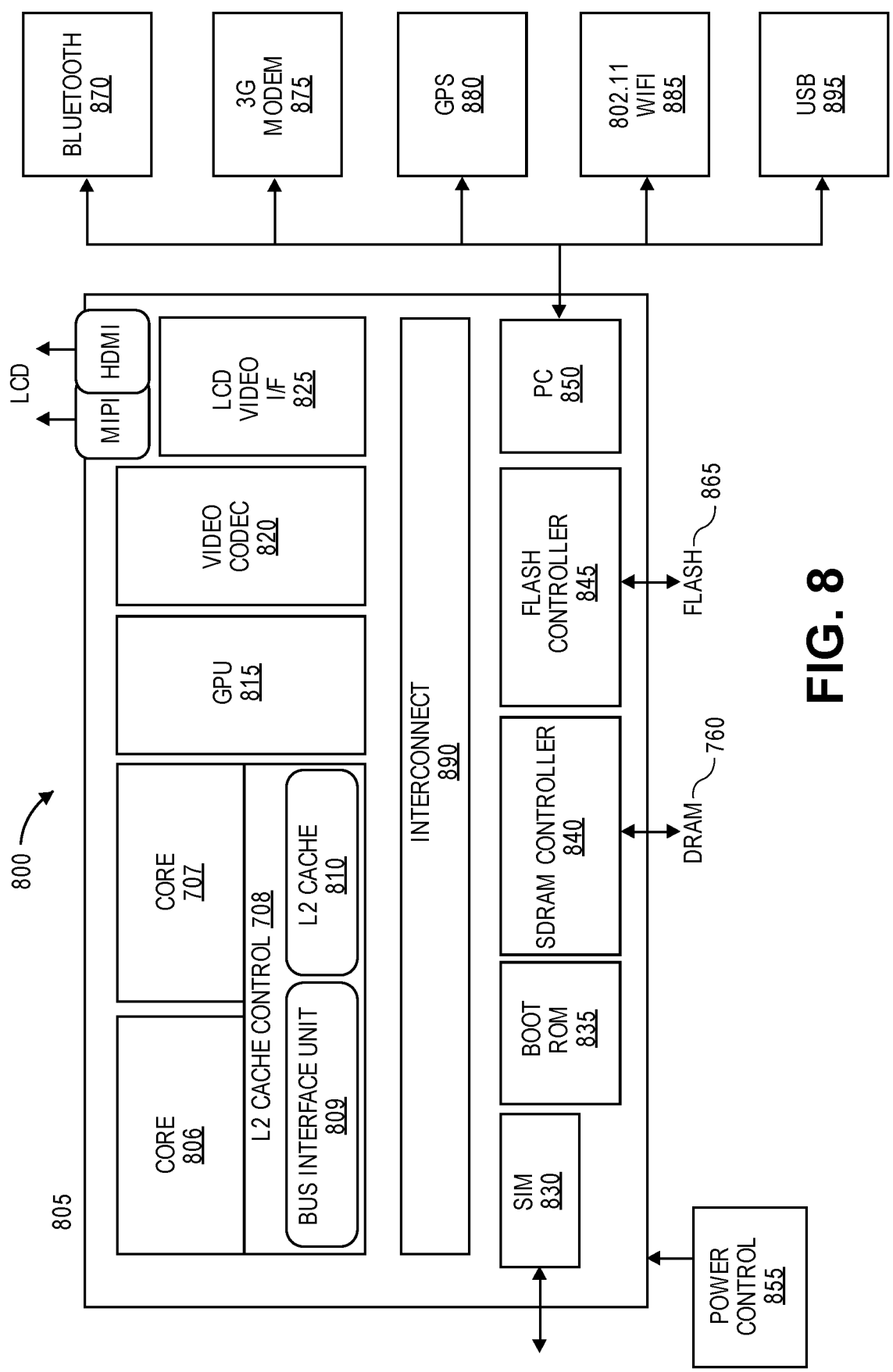
FIG. 8 is a diagram of one embodiment of a system on a chip (SOC) that may implement aspects of the embodiments.

FIG. 8 is a diagram of one embodiment of a system on-chip (SOC) design that may be utilized to implement the embodiments. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 890 includes an on-chip interconnect, such as an Intel on chip system fabric (IOSF), advanced microcontroller bus architecture (AMBA), or other interconnect, which potentially implements one or more aspects of the described embodiments.

Interconnect 890 provides communication channels to the other components, such as a Subscriber Identity Module (SIM) 830 to interface with a SIM card, a boot ROM 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), graphic processing unit (GPU) 815 to perform graphics related computations, etc. Any of these interfaces may incorporate aspects of the embodiments described herein.

In addition, the system illustrates peripherals for communication, such as a Bluetooth module 870, 3G modem 875, GPS 880, and WiFi 885. Note as stated above, a UE includes a radio for communication. As a result, these peripheral communication modules are not all required. However, in a UE some form a radio for external communication is to be included. The UE can include a USB controller 895 that may communicate over a link or set of links with other components either internal or external to the UE and where a repeater such as the embodiments of a redriver with a tuning circuit may be utilized in the link. In further embodiments, the USB controller 895 may be a sub-component of the peripheral communication modules or the peripheral communication module may be a USB controller 895.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 9:
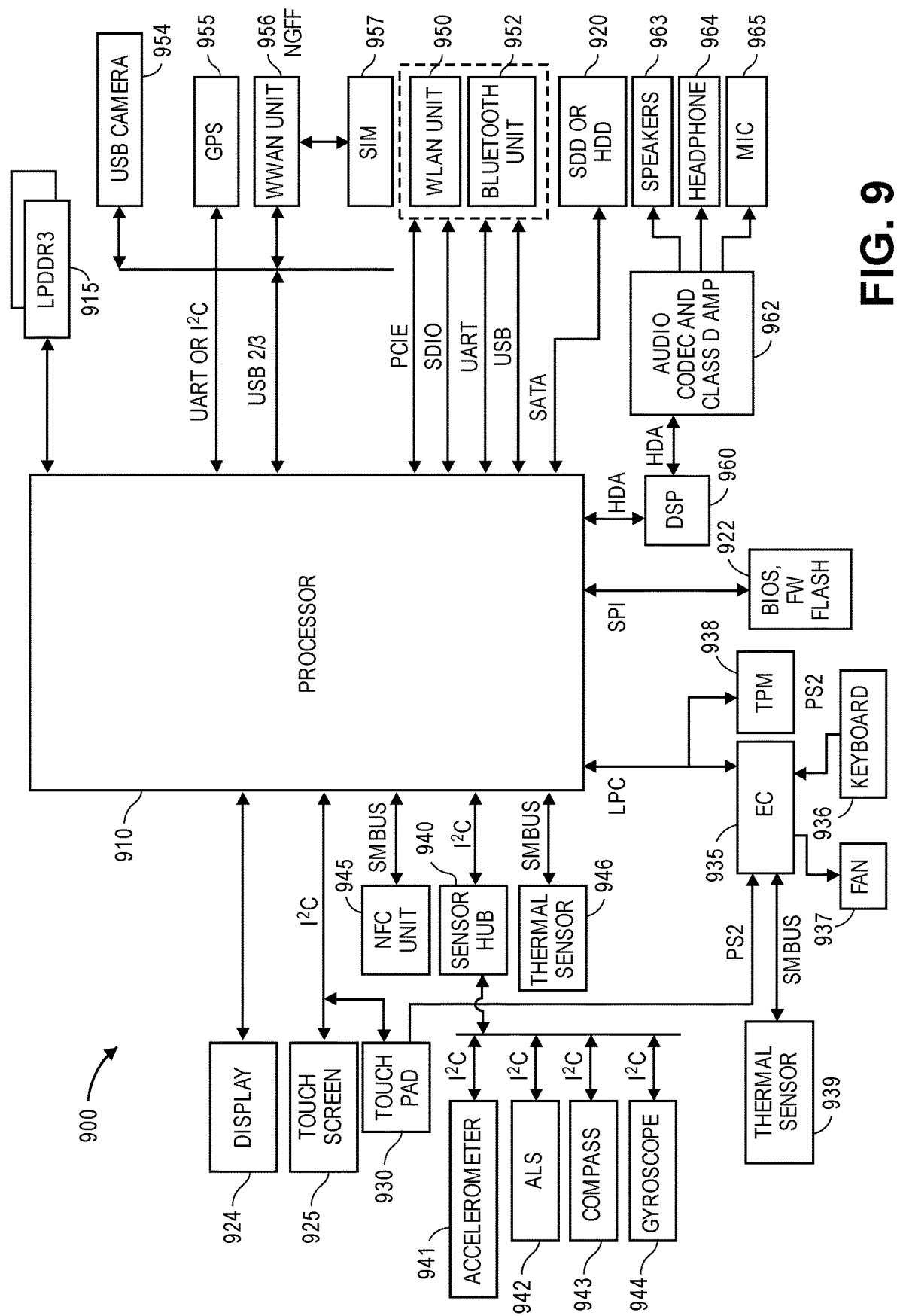
FIG. 9 is a diagram of computing system including the SOC and components that implemented the embodiments.

FIG. 9 is a block diagram of components present in a computer system as an example implementation of the components of the embodiments. As shown in FIG. 9, system 900 includes any combination of components. These components may be implemented as integrated circuits (ICs), portions thereof, discrete electronic devices, or other modules, logic, hardware, software, firmware, or a combination thereof adapted in a computer system, or as components otherwise incorporated within a chassis of the computer system. Note also that the block diagram of FIG. 9 is intended to show a high-level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 9, a processor 910, in one embodiment, includes a microprocessor, multi-core processor, multithreaded processor, an ultra low voltage processor, an embedded processor, or other known processing element. In the illustrated implementation, processor 910 acts as a main processing unit and central hub for communication with many of the various components of the system 900. As one example, processor 910 is implemented as a system on a chip (SoC). As a specific illustrative example, processor 910 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 910 in one implementation will be discussed further below to provide an illustrative example.

Processor 910, in one embodiment, communicates with a system memory 915. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2011), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 920 may also couple to processor 910. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, shown in FIG. 9, a flash device 922 may be coupled to processor 910, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (TO) devices may be present within system 900. Specifically shown in the embodiment of FIG. 9 is a display 924 which may be a high definition LCD or LED panel configured within a lid portion of the chassis. This display panel may also provide for a touch screen 925, e.g., adapted externally over the display panel such that via a user's interaction with this touch screen, user inputs can be provided to the system to enable desired operations, e.g., with regard to the display of information, accessing of information and so forth. In one embodiment, display 924 may be coupled to processor 910 via a display interconnect that can be implemented as a high-performance graphics interconnect. Touch screen 925 may be coupled to processor 910 via another interconnect, which in an embodiment can be an I$^2$C interconnect. As further shown in FIG. 9, in addition to touch screen 925, user input by way of touch can also occur via a touch pad 930 which may be configured within the chassis and may also be coupled to the same I$^2$C interconnect as touch screen 925.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited 10 interference when using multi-touch.

For perceptual computing and other purposes, various sensors may be present within the system and may be coupled to processor 910 in different manners. Certain inertial and environmental sensors may couple to processor 910 through a sensor hub 940, e.g., via an I²C interconnect. In the embodiment shown in FIG. 9, these sensors may include an accelerometer 941, an ambient light sensor (ALS) 942, a compass 943 and a gyroscope 944. Other environmental sensors may include one or more thermal sensors 946 which in some embodiments couple to processor 910 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off In such a platform, power management can be made to be transparent to applications and maintain constant connectivity, in part due to offload technology to enable the lowest powered component to perform an operation.

Also, seen in FIG. 9, various peripheral devices may couple to processor 910 via a low pin count (LPC) interconnect. In the embodiment shown, various components can be coupled through an embedded controller (EC) 935. Such components can include a keyboard 936 (e.g., coupled via a PS2 interface), a fan 937, and a thermal sensor 939. In some embodiments, touch pad 930 may also couple to EC 935 via a PS2 interface. In addition, a security processor such as a trusted platform module (TPM) 938 in accordance with the Trusted Computing Group (TCG) TPM Specification Version 1.2, dated Oct. 2, 2003, may also couple to processor 910 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. These USB ports and the associated links may implement the embodiments described herein with relation to the use of repeaters with tuning circuits in links and support for such devices in USB controllers. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 900 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a near field communication (NFC) unit 945 which may communicate, in one embodiment with processor 910 via an SMBus. Note that via this NFC unit 945, devices in close proximity to each other can communicate. For example, a user can enable system 900 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 9, additional wireless units can include other short range wireless engines including a WLAN unit 950 and a Bluetooth unit 952. Using WLAN unit 950, Wi-Fi™ communications in accordance with a given Institute of Electrical and Electronics Engineers (IEEE) 802.11 standard can be realized, while via Bluetooth unit 952, short range communications via a Bluetooth protocol can occur. These units may communicate with processor 910 via, e.g., a USB link or a universal asynchronous receiver transmitter (UART) link. These USB links may implement the embodiments described herein with relation to the use of repeaters with tuning circuits in links and support for such devices in USB controllers. Or these units may couple to processor 910 via an interconnect according to a Peripheral Component Interconnect Express™ (PCIe™) protocol, e.g., in accordance with the PCI Express™ Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 956 which in turn may couple to a subscriber identity module (SIM) 957. In addition, to enable receipt and use of location information, a GPS module 955 may also be present. Note that in the embodiment shown in FIG. 9, WWAN unit 956 and an integrated capture device such as a camera module 954 may communicate via a given USB protocol, e.g., USB 2.0 or 3.1 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 960, which may couple to processor 910 via a high definition audio (HDA) link. Similarly, DSP 960 may communicate with an integrated coder/decoder (CODEC) and amplifier 962 that in turn may couple to output speakers 963 which may be implemented within the chassis. Similarly, amplifier and CODEC 962 can be coupled to receive audio inputs from a microphone 965 which in an embodiment can be implemented via dual array microphones (such as a digital microphone array) to provide for high quality audio inputs to enable voice-activated control of various operations within the system. Note also that audio outputs can be provided from amplifier/CODEC 962 to a headphone jack 964. Although shown with these particular components in the embodiment of FIG. 9, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 910 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 935. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. A method implemented by a repeater in a link of a Universal Serial Bus or an embedded Universal Serial Bus link, the method comprising:

enabling a counter to count alternations of a clock signal received from a host or device over the link;

comparing a value of the counter to a reference count of oscillations of an oscillator of the repeater;

adjusting a frequency selection based on the comparison of the value of the counter to the reference count; and locking the frequency selection in response to the counter matching the reference count.

2. The method of claim 1, further comprising:

locking the frequency selection in response to an end of a designated training period.

3. The method of claim 1, further comprising;

sending a request for the clock signal to the host; and sending an acknowledgement to the host in response to receipt of the clock signal.

4. The method of claim 1, further comprising:

determining the counter based on averaging over a set of clock cycles.

5. The method of claim 1, further comprising:

initiating the method in response to detecting the link is idle.

6. The method of claim 1, wherein adjusting the frequency selection comprises:

decreasing the frequency selection where the comparison indicates the value of the counter is greater than reference count; and increasing the frequency selection where the comparison indicates the value of the counter is less than reference count.

7. A repeater in a link of a Universal Serial Bus or an embedded Universal Serial Bus link, the repeater comprising:

a transceiver to communicate with a host or device over the link; and a tuning circuit coupled to an output of the transceiver, the tuning circuit including a counter to receive an input from the transceiver and to count alternations of a clock signal received from the host over the link, the tuning circuit further including a finite state machine to compare a value of the counter to a reference count of oscillations of an oscillator of the repeater, and to set a frequency of the oscillator based on the comparison of the value of the counter to the reference count.

8. The repeater of claim 7, wherein the tuning circuit is further to lock a frequency selection in response to an end of a designated training period.

9. The repeater of claim 7, wherein the tuning circuit is further to send a request for the clock signal to the host and to send an acknowledgement to the host in response to receipt of the clock signal.

10. The repeater of claim 7, wherein the tuning circuit is further to determine the counter based on averaging over a set of clock cycles.

11. The repeater of claim 7, wherein the tuning circuit is further to initiate calibration in response to detecting the link is idle.

12. The repeater of claim 7, wherein setting the frequency includes increasing a frequency selection where the comparison indicates the reference count is greater than the value of the counter, and decreasing the frequency selection where the comparison indicates the reference count is less than the value of the counter.

13. A tuning circuit in a repeater connected to a link of a Universal Serial Bus or an embedded Universal Serial Bus link, the tuning circuit comprising:

a sampling block and counter to count alternations of a clock signal received from a host or device over the link;

an oscillator to drive operation of clock oscillations of a clock of the repeater; and a finite state machine coupled to the oscillator and the sampling block and counter, the finite state machine to generate a frequency selection based on a comparison of a value of the counter and a reference count of the clock oscillations.

14. The tuning circuit of claim 13, wherein the finite state machine is further to lock the frequency selection in response to an end of a designated training period.

15. The tuning circuit of claim 13, wherein the finite state machine is further to send a request for the clock signal to the host and to send an acknowledgement to the host in response to receipt of the clock signal.

16. The tuning circuit of claim 13, wherein the finite state machine is further to determine the counter based on averaging over a set of clock cycles.

17. The tuning circuit of claim 13, wherein the tuning circuit is further to initiate calibration in response to detecting the link is idle.

18. The tuning circuit of claim 13, wherein adjusting the frequency selection includes increasing the frequency selection where the comparison indicates the reference count is greater than the value of the counter, and decreasing the frequency selection where the comparison indicates the reference count is less than the value of the counter.

* * * * *